Aug. 5, 1941. K. C. WELCH Re. 21,871

SHELF SUPPORT

Original Filed May 31, 1939

Inventor
Kenneth C. Welch
By Lorance and Van Antwerp
Attorneys

Reissued Aug. 5, 1941 Re. 21,871

UNITED STATES PATENT OFFICE 21,871

SHELF SUPPORT

Kenneth C. Welch, Grand Rapids, Mich., assignor to Grand Rapids Store Equipment Co., Grand Rapids, Mich., a corporation of Michigan Original No. 2,208,234, dated July 16, 1940, Serial No. 276,655, May 31, 1939. Application for reissue February 19, 1941, Serial No. 379,736

10 Claims. (Cl. 248—243)

This invention relates to shelving and particularly to supports therefor. It is a primary object and purpose of the present invention to provide a very simple, practical and useful shelving construction and support for adjustably carrying horizontal shelves between the vertical ends of cases or frames, whereby the shelves may be readily adjusted to a large number of positions and held in any position to which adjusted. It is a further object of the invention to provide a shelving support construction which may also be used to lock a shelf in a position to which adjusted, and prevent its upward movement away from the supporting element beneath, and, preferably, the locking means will be identical with the shelf carrying and supporting means.

Many other objects and purposes than those stated will be apparent as an understanding of the invention is had from the following description, taken in connection with the accompanying drawing, in which.

Like reference characters refer to like parts in the different figures of the drawing.

Figure 1:
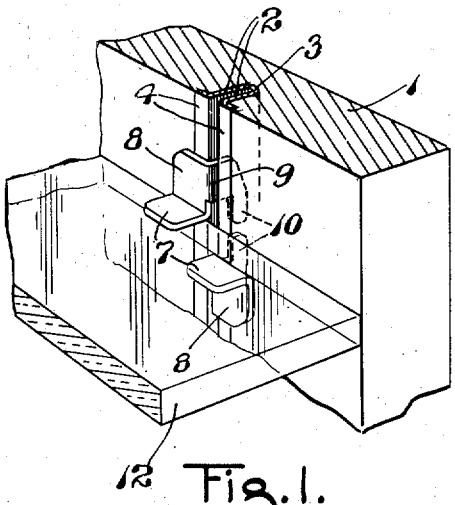
Fig. 1 is a fragmentary vertical section illustrating the shelving support of my invention used with a horizontally located shelf, and also showing the manner in which the shelf is held against vertical movement.

In shelving two spaced apart vertical ends 1 are provided which may be connected at their lower ends by a base and at their upper ends by a top cornice. At the inner sides of the end members 1, and at at least two points between the front and rear edges of the ends 1, a sheet metal U-shaped channel is inserted in a vertical groove made for its reception, the channel being bent into form from a single plate of sheet metal, and having sides 2 connected by a bend at 3. At the outer edges of the sides 2, flanges 4 may be turned outwardly away from each other. From the opposite sides 2 of the metal channel member described, tongues 5 and 6 are struck inwardly as best shown in Fig. 4, the tongues 5 extending upwardly and inwardly at an angle to the vertical, and the tongues 6 from the opposite side extending downwardly and inwardly as shown, whereby said tongues overlap each other in spaced pairs, as illustrated in Fig. 4.

Figure 5:
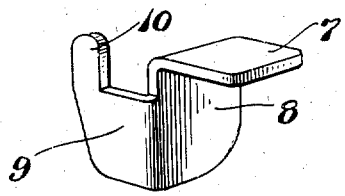
Fig. 5 is a perspective view of one of the shelf carrying brackets, which also may be used above a shelf to maintain it against upward movement.

The shelving brackets which are used are made from a single plate of sheet metal into the form shown in Fig. 5. A horizontal ledge 7 is provided, from which is an integral downwardly extending section 8. At one edge of the section 8 a section 9 is turned at right angles, being cut away at its upper portion so as not to reach to the upper edges of said section 8, and at its free upper corner the section 9 is continued in a vertical finger 10.

Figure 2:
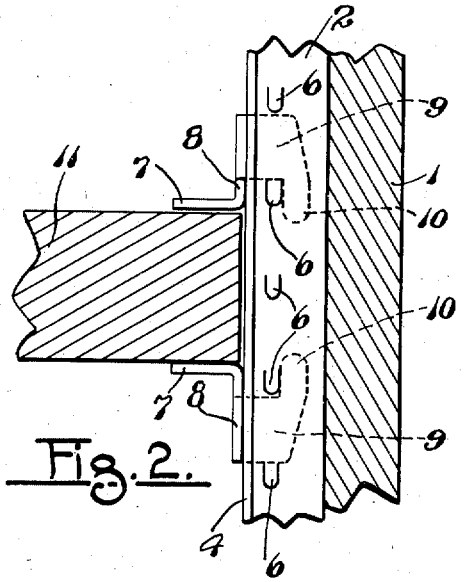
Fig. 2 is a fragmentary vertical section of one end of a shelf, and the vertical supporting member which carries it, the shelf supporting means being shown in elevation.
Figure 3:
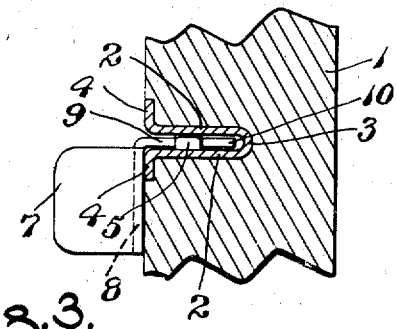
Fig. 3 is a horizontal section through one end of the shelving structure, showing a shelf support in plan.
Figure 4:
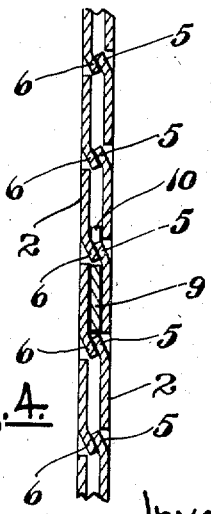
Fig. 4 is a longitudinal vertical section through the channel member which is mounted upon a vertical end of the shelving structure, and upon which the immediate shelf supporting elements are adjustably carried.

As shelf bracket of the character described may be inserted, as indicated in Fig. 2 into the space between the sides 2 of the channel, the finger 10 extending vertically back of two of the overlapping tongues 5 and 6, while the lower edge of the section 9 bears upon the upper edge of the next lowermost tongue 5, as shown in Fig. 4. The section 8 lies flat against the inner side of the end 1 of the shelving frame, with the ledge 7 extending horizontally therefrom at right angles to and away from the inner side of said end member 1. With a plurality of the bracket members carried by the opposite end members 1 of the frame, having their ledges 7 all in the same horizontal plane, a shelf 11 (Fig. 2) may be placed thereupon and be held and supported in a horizontal position. If desired like bracket members may be hooked into the channel members in inverted position spaced upwardly from the supporting bracket members a distance equal to the thickness of the shelf and the shelf inserted between the upper and lower brackets as illustrated in Fig. 2, which will prevent the shelf from being inadvertently raised out of position.

With this construction also, by properly spacing the tongues 5 and 6, a shelf such as 11 of wood and of the normal standard thickness of a wooden shelf may be supported and locked in place as described, while a narrower shelf 12 of glass, as in Fig. 1, may be supported upon the same lower brackets, but because of its reduced thickness, the upper brackets used as locking means will be connected with and between lower spaced tongues 5 and 6. This works out satisfactorily with wood and glass shelves of regular standard thicknesses and with the tongues 5 and 6 dimensionally spaced in accordance with the thickness of the glass shelf which is approximately one-half the thickness of a shelf of wood.

The construction described is simple, yet very practical and useful. In use it has proven very satisfactory.

It is to be understood that the invention is not restricted in use to supporting shelves. The same construction without change may be applied to cases or cabinets to serve as adjustable drawer supports, the drawers resting upon and moving over the ledges 7. There are various other places of use which will occur to those skilled in the art, and which have occurred to me, therefore, the invention is to be considered as comprehending all forms of structure and all uses of the structure such as come within the scope of the appended claims which define the invention.

I claim:

1. A construction of the class described comprising, a vertically positioned supporting member of channel form having vertical spaced apart sides, one of said sides having tongues struck therefrom upwardly and inwardly at an angle to the vertical, and the other of said sides having tongues struck therefrom downwardly and inwardly, whereby the tongues substantially engage against each other at adjacent sides, said tongues being spaced vertically in the length of the support, and a bracket of flat metal having a section to pass between two adjacent pairs of tongues, said section resting at its lower edge upon a lower tongue and having at its upper inner portion an upwardly extending finger located behind the upper tongues, and said bracket including a horizontal ledge extending away from the support, as specified.

2. In a construction of the class described, a support having spaced apart parallel vertical sides, the depth of the space between said sides being greatly in excess of the distance between said sides, vertically spaced supporting means located horizontally between the sides of the support, a shelf supporting bracket having a flat vertical portion adapted to rest at its lower edge on one of said supporting means and to have a hooked connection at its upper portion with the next adjacent upper means, said bracket having a substantially horizontal ledge extending away from the support, and a second like bracket located in an inverted position over and spaced from the first bracket, located between and connected with two of said spaced supporting means above the first bracket, whereby its horizontal ledge will be located over and parallel to the horizontal ledge of the first bracket, between which ledges the edge portion of a shelf is adapted to be placed, as specified.

3. A shelf bracket comprising, a vertical section having at its free upper corner an upwardly extending finger, a second vertical section integrally connected with the first section at the edge thereof opposite said finger and located in a plane substantially at right angles to the first section, and a substantially horizontal ledge integrally connected with and extending at right angles from the upper portion of said second section, as and for the purposes specified.

4. A shelf bracket formed from a single plate of flat metal comprising, a section located in a substantially vertical plane having parallel upper and lower edges and having a vertically extending finger at its upper free corner portion, the edge of said section, from the lower outer edge of said finger downwardly to the lower edge of the section, being inclined to the vertical, said bracket including a second section located in a substantially vertical plane and integrally connected at one edge to the opposite edge of the first section and extending above the first section for a short distance, and then bent into a substantially horizontal ledge which extends away from said finger, as specified.

5. A construction of the class described comprising, a vertical member having a vertical slot therein at its inner side, the depth of which is greatly in excess of its width, a vertical narrow channel structure having spaced apart sides housed in said slot and presenting an elongated vertical narrow opening from one end thereof to the other, vertically spaced supporting devices located between the sides of said channel and disposed inwardly a substantial distance from the outer opening thereof, and a bracket having a vertical flat metal portion extending into said channel between its sides cooperatively associated with said supporting devices, as specified.

6. A construction of the class described comprising, a vertical member having a vertical slot therein at its inner side extending partially through said member toward its outer side, the depth of the slot being greatly in excess of its width, a vertical support having parallel spaced apart flat metal sides located in said slot, the sides of said support lying against opposite sides of said slot and being spaced a short distance apart, supporting devices extending between and carried by said sides of the support and located inwardly a substantial distance from the outer opening between said sides of the support, and a bracket having a vertical flat metal portion extending between the sides of the support cooperatively associated with selected spaced supporting devices to thereby detachably carry said bracket, as specified.

7. A construction of the class described comprising, a vertical member having a narrow vertical channel therein at its inner side, the depth of which is greatly in excess of its width, vertically spaced supporting devices located between the sides of said channel and disposed inwardly a substantial distance from the outer opening thereof, a bracket having a vertical flat portion of slightly less width than the width of the channel and slightly less in height than the vertical distance between two adjacent supporting supporting devices extending into said channel and means for detachably interlocking said vertical flat portion with the upper of two immediately adjacent supporting devices and with the lower edge of the vertical flat portion bearing against the lower of said two adjacent supporting devices.

8. A construction of the class described comprising, a vertical member having a vertical slot therein at its inner side, the slot being wholly within said side and the depth of the slot being greatly in excess of its width, vertically spaced supporting means located between the sides of said slot and disposed inwardly a substantial distance from the outer opening thereof, and a bracket having a vertical flat metal portion extending into said slot between its sides and between two immediately adjacent supporting means, said flat metal portion being slightly less in height than the vertical distance between any two adjacent supporting devices, and means on said vertical flat portion adapted to detachably engage back of the upper of any two immediately adjacent supporting devices, the lower edge of said vertical flat portion of the bracket resting upon the next lower supporting device.

9. A construction of the class described comprising, a vertical member having a narrow vertical slot therein at its inner side, the depth of which greatly exceeds its width, spaced horizontal supporting elements between the sides of the slot located an appreciable distance inwardly from the opening of said slot, detachable and interchangeable fixtures mounted on said member having flat vertical bracket portions of a thickness slightly less than the narrow widths of said slots and of a height slightly less than the vertical distance between two immediately adjacent horizontal supporting elements extending into said slots and means on said flat vertical bracket portions detachably engaging with selected supporting elements whereby the brackets are held against upward or outwardly bodily movement in a direction at right angles to the plane of the inner side of said member, said vertical flat bracket portions at their lower edges bearing upon the next adjacent horizontal supporting elements.

10. A construction of the class described comprising, a vertical member having a vertical slot therein in a side thereof, a plurality of vertically spaced supporting elements between the sides of the slot located an appreciable distance inwardly from the opening of said slot and between said opening and the bottom of the slot, a detachable adjustable fixture mounted on said member, said fixture having a flat portion in a vertical plane extending into said slot and having means to detachably engage with said supporting elements, the vertical dimensions of said flat portion being greatly in excess of its thickness and being slightly less in thickness than the width of the slots so as to be freely received therein, and means on said vertical flat portion detachably connecting with the upper of two adjacent selected supporting elements one located over the other, said vertical flat portion resting on the next lower supporting element.

KENNETH C. WELCH.